United States Patent
Hibshman, II et al.

(10) Patent No.: US 7,536,252 B1
(45) Date of Patent: May 19, 2009

(54) METHOD AND SYSTEM FOR CONTROLLING A FLOWRATE OF A RECIRCULATED EXHAUST GAS

(75) Inventors: Joell R. Hibshman, II, Greer, SC (US); Sam D. Draper, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 52 days.

(21) Appl. No.: 11/953,556

(22) Filed: Dec. 10, 2007

(51) Int. Cl.
*B60T 7/12* (2006.01)
*F02M 25/07* (2006.01)

(52) U.S. Cl. .................. 701/108; 701/100; 60/605.2

(58) Field of Classification Search .............. 701/100, 701/108, 114, 102–105; 123/568.11, 568.21; 60/284–289, 605.2, 750, 39.52
See application file for complete search history.

(56) References Cited

U.S. PATENT DOCUMENTS

| | | | |
|---|---|---|---|
| 5,794,431 A | | 8/1998 | Utamura et al. |
| 5,974,802 A | * | 11/1999 | Blake ................ 60/605.2 |
| 6,173,562 B1 | | 1/2001 | Utamura et al. |
| 6,202,400 B1 | | 3/2001 | Utamura et al. |
| 6,601,387 B2 | * | 8/2003 | Zurawski et al. ........... 60/605.2 |
| 6,866,030 B1 | * | 3/2005 | Sun et al. ............... 123/568.21 |
| 7,437,874 B2 | * | 10/2008 | Ramamurthy et al. ......... 60/602 |
| 2005/0228573 A1 | * | 10/2005 | Gangopadhyay ............ 701/108 |

OTHER PUBLICATIONS

Rokke, Petter and Johan E. Hustad, "Exhaust Gas Recirculation in Gas Turbines for Reduction of $CO_2$ Emissions; Combustion Testing with Focus on Stability and Emissions", Int. J. of Thermodynamics, vol. 8 (No. 4), pp. 167-173. Sep. 2005.
Wilkes, C. and B. Gerhold, "NOx Reduction From a Gas Turbine Combustor Using Exhaust Gas Recirculation." ASME 80-JPGC/GT-5, Joint Power Generation Conference, Phoenix, AZ, Sep. 28-Oct. 2, 1980.

* cited by examiner

*Primary Examiner*—Stephen K. Cronin
*Assistant Examiner*—Johnny H. Hoang
(74) *Attorney, Agent, or Firm*—Dale J. Davis; Ernst G. Cusick; Frank A. Landgraff

(57) ABSTRACT

A method and system for controlling an exhaust gas recirculation (EGR) system is provided. The EGR system recirculates a portion of an exhaust through an inlet portion of the turbomachine. The EGR system reduces the level of harmful constituents within the exhaust before the recirculation occurs.

20 Claims, 3 Drawing Sheets

METHOD AND SYSTEM FOR CONTROLLING A FLOWRATE OF A RECIRCULATED EXHAUST GAS

BACKGROUND OF THE INVENTION

This application is related to commonly-assigned U.S. patent application Ser. No. 11/928,038, filed Oct. 30, 2007 and U.S. patent application Ser. No. 11/953,524, filed Dec. 10, 2007.

The present invention relates to an exhaust gas recirculation system, and more particularly to a method and system for controlling the quantity of exhaust reentering a turbomachine after processing by a recirculation system.

There is a growing concern over the long-term effects of Nitrogen Oxides (hereinafter NOx) and Carbon Dioxide (hereinafter "$CO_2$") and Sulfur Oxides (SOx) emissions on the environment. The allowable levels of emissions that may be emitted by a turbomachine, such as a gas turbine, are heavily regulated. Operators of turbomachines desire methods of reducing the levels of NOx, $CO_2$, and SOx emitted.

Significant amounts of condensable vapors exist in the exhaust gas stream. These vapors usually contain a variety of constituents such as water, acids, aldehydes, hydrocarbons, sulfur oxides, and chlorine compounds. Left untreated, these constituents will accelerate corrosion and fouling of the internal components if allowed to enter the gas turbine.

Exhaust gas recirculation (EGR) generally involves recirculating a portion of the emitted exhaust through an inlet portion of the turbomachine. The exhaust is then mixed with the incoming airflow prior to combustion. The EGR process facilitates the removal and sequestration of concentrated $CO_2$, and may also reduce the NOx and SOx emission levels.

There are a few concerns with the currently known EGR systems. The quantity and rate of the recirculated exhaust impacts the turbomachine operability. combustor stability, emissions, compressor stability, and component life.

For the foregoing reasons, there is a need for a method and system for controlling the composition of the inlet fluid exiting the EGR system. The method and system should control the quantity and rate of exhaust reentering the turbomachine. The method and system should use the composition of the inlet fluid as a control parameter.

BRIEF DESCRIPTION OF THE INVENTION

In accordance with an embodiment of the present invention, a method of controlling an exhaust stream, wherein the exhaust stream is generated by a turbomachine; the method comprising: providing at least one exhaust gas recirculation (EGR) system comprising: at least one EGR flow conditioning device, a constituent reduction system, at least one flow control device; wherein the at least one EGR flow conditioning device increases the flowrate of the exhaust stream and comprises a source of air; wherein the source of air comprises a fan, wherein the EGR system reduces constituents within the exhaust stream from a first concentration to a second concentration and recirculates the exhaust stream to an inlet section of the turbomachine; receiving a target EGR fraction comprising the portion of the exhaust stream within an inlet fluid, wherein the inlet fluid enters the inlet section of the turbomachine; determining a target level of at least one constituent from the target EGR fraction; determining a current level of the at least one constituent; determining whether the current level of the at least one constituent is within a constituent range; and adjusting a recirculation rate of the exhaust stream if the at least one constituent is outside of the constituent range.

In accordance with an alternate embodiment of the present invention, a method of controlling an exhaust stream, wherein the exhaust stream is generated by a turbomachine; the method comprising: providing at least one exhaust gas recirculation (EGR) system comprising: at least one EGR flow conditioning device, a constituent reduction system, at least one flow control device; wherein the at least one EGR flow conditioning device comprises a fan; wherein the EGR system reduces constituents within the exhaust stream from a first concentration to a second concentration and recirculates the exhaust stream to an inlet section of the turbomachine; wherein the constituent reduction system removes up to about 99 percent of SOx constituents within the exhaust stream; receiving a target EGR fraction comprising the portion of the exhaust stream within an inlet fluid, wherein the inlet fluid enters the inlet section of the turbomachine; determining a target level of at least one constituent from the target EGR fraction comprising receiving data on the at least one constituent from at least one constituent feedback device; determining a current level of the at least one constituent; determining whether the current level of the at least one constituent is within a constituent range; and adjusting a EGR rate of the exhaust stream if the at least one constituent is outside of the constituent range; wherein the step of adjusting the EGR rate comprises providing at least one notification when the EGR rate of the exhaust stream requires adjustment; wherein the at least one constituent comprises at least one of: SOx, NOx, $CO_2$, water, chloride ions, acids, aldehydes, hydrocarbons, or combinations thereof.

In accordance with another alternate embodiment of the present invention, a system for controlling an exhaust stream, wherein the exhaust stream is generated by a turbomachine; the system comprising: at least one exhaust gas recirculation (EGR) system comprising: at least one EGR flow conditioning device, a constituent reduction system, at least one flow control device; wherein the EGR system reduces constituents within the exhaust stream from a first concentration to a second concentration and recirculates the exhaust stream to an inlet section of the turbomachine; means for receiving a target EGR fraction; means for determining a target level of at least one constituent from the target EGR fraction; means for determining a current level of the at least one constituent; means for determining whether the current level of the at least one constituent is within a constituent range; means for adjusting a EGR rate of the exhaust stream if the at least one constituent is outside of the constituent range; and means for providing at least one notification when the EGR rate of the exhaust stream requires adjustment.

DETAILED DESCRIPTION OF THE INVENTION

The following detailed description of preferred embodiments refers to the accompanying drawings, which illustrate specific embodiments of the invention. Other embodiments having different structures and operations do not depart from the scope of the present invention.

Certain terminology is used herein for the convenience of the reader only and is not to be taken as a limitation on the scope of the invention. For example, words such as "upper," "lower," "left," "right," "front", "rear" "top", "bottom", "horizontal," "vertical," "upstream," "downstream," "fore", "aft", and the like; merely describe the configuration shown in the Figures. Indeed, the element or elements of an embodiment of the present invention may be oriented in any direction and the terminology, therefore, should be understood as encompassing such variations unless specified otherwise.

The present invention has the technical effect of controlling the composition of an inlet fluid exiting an EGR system and entering the inlet portion of a turbomachine.

An EGR rate may be considered the rate and quantity of exhaust stream that enters the inlet section of the turbomachine. The composition of the inlet fluid includes, but is not limiting of, the exhaust stream, the inlet air, and at least one of the aforementioned constituents, and combinations thereof.

The present invention may be applied to the variety of turbomachines that produce a gaseous fluid, such as, but not limiting of, a heavy duty gas turbine; an aero-derivative gas turbine; or the like (hereinafter referred to as "gas turbine"). An embodiment of the present invention may be applied to either a single gas turbine or a plurality of gas turbines. An embodiment of the present invention may be applied to a gas turbine operating in a simple cycle or a combined cycle configuration.

Figure 1:
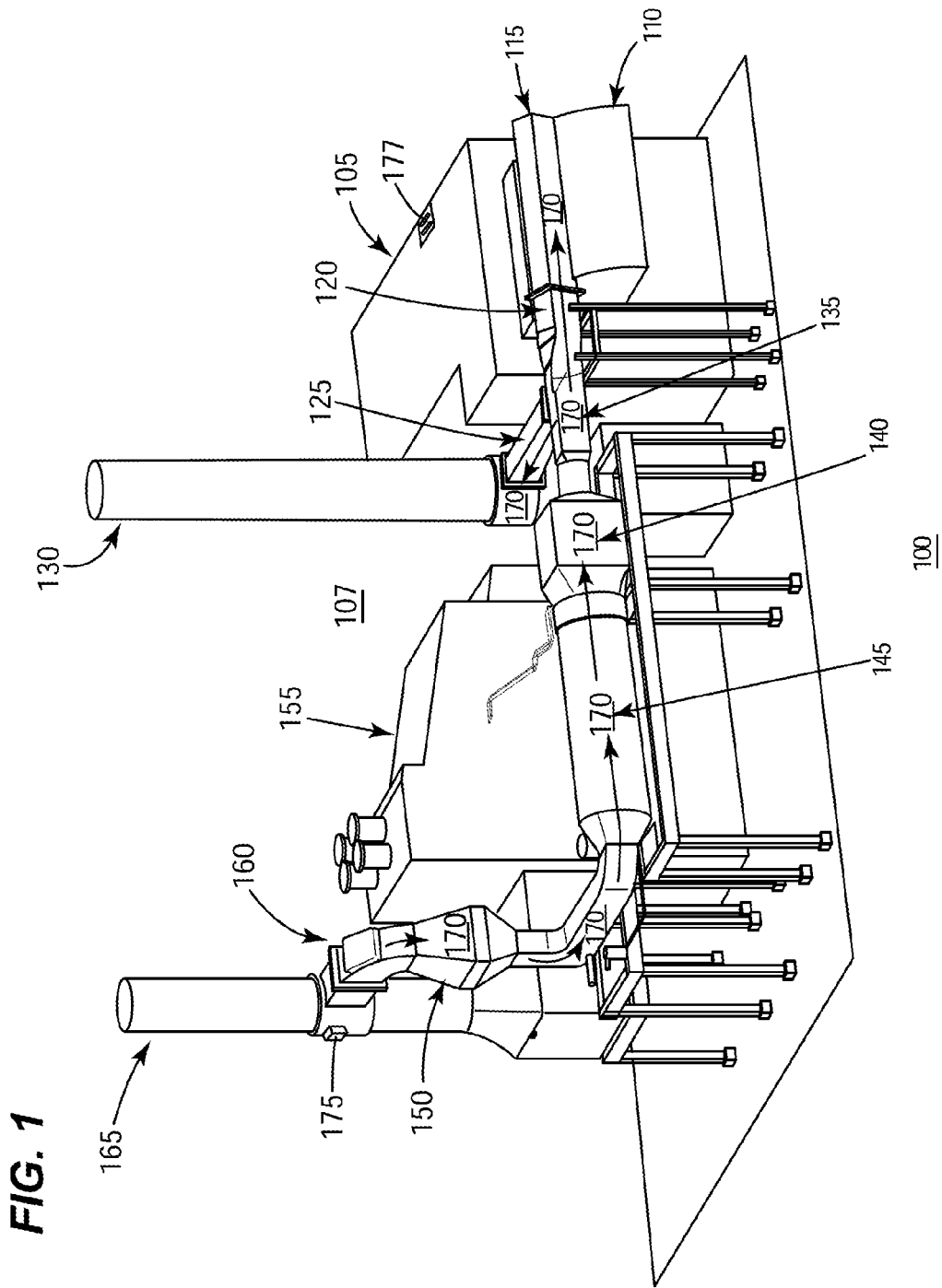
FIG. 1 is a schematic illustrating the environment in which an embodiment of the present invention operates.

Referring now to the Figures, where the various numbers represent like elements throughout the several views, FIG. 1 is a schematic illustrating the environment in which an embodiment of the present invention operates. FIG. 1 illustrates a site 100, such as but not limiting of a powerplant site, having a turbomachine 105, an EGR system 107, a heat recovery steam generator (HRSG) 155, and an exhaust stack 165. Alternatively, the present invention may be integrated with a site 100 not having the HRSG 155.

The EGR system 107 comprises multiple elements. The configuration and sequence of these elements may be dictated by the composition of the exhaust stream 170 and the type of cooling fluid used by the components of the EGR system 107. Furthermore, alternate embodiments of the EGR system 107 may include additional or fewer components than the components described below. Therefore, various arrangements, and/or configurations, which differ from FIG. 1, may be integrated with an embodiment of the present invention.

As illustrated in FIG. 1, the EGR system 107 comprises: a mixing station 115, an inlet modulation device 120, a bypass modulation device 125, a bypass stack 130, at least one EGR flow conditioning device 135, a downstream temperature conditioning device 140, a constituent reduction system 145, a upstream temperature conditioning device 150, at least one exhaust modulation device 160, and constituent feedback devices 175,177.

Generally, the process used by the EGR system 107 may include: cooling of the exhaust stream 170; reduction and removal of the aforementioned constituents within the exhaust stream 170; and then mixing the exhaust stream 170 with the inlet air, forming an inlet fluid; which flows from the inlet section 110 through to the exhaust stack 165. The EGR system 107 may reduce the temperature of the exhaust stream 170 to a saturation temperature where the aforementioned constituents may condense and then be removed. Alternatively, the EGR system 107 may also reduce the temperature of, and use a scrubbing process (or the like) on, the exhaust stream 170 to remove the aforementioned constituents.

While EGR system 107 operates, constituent feedback devices 175,177 may determine the level of at least one constituent within the inlet fluid. As illustrated in FIG. 1, a constituent feedback device 175 may be located adjacent the exhaust stack 165 and another constituent feedback device 177 may be located adjacent the inlet section 110 of the turbomachine 105. In an alternate embodiment of the present invention at least one constituent feedback device 175,177 may be located adjacent at least one extraction port located on the turbomachine. Generally, the placement of the constituent feedback devices 175,177 allows for determining the concentration of at least one constituent within the inlet fluid.

As will be appreciated, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system". Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block.

The present invention may include a control system, or the like, that has the technical effect of controlling the composition of an inlet fluid exiting an EGR system and entering the inlet portion of a turbomachine. The present invention may be configured to automatically or continuously monitor the inlet fluid of the turbomachine 105 to determine the quantity of the exhaust stream 170 that should enter the inlet section 110. Alternatively, the control system may be configured to require a user action to the initiate operation. An embodiment of the control system of the present invention may function as a stand-alone system. Alternatively, the control system may be integrated as a module, or the like, within a broader system, such as a turbine control or a plant control system. For example, but not limiting of, the control system of the present invention may be integrated with the control system operating the EGR system 107.

Figure 2:
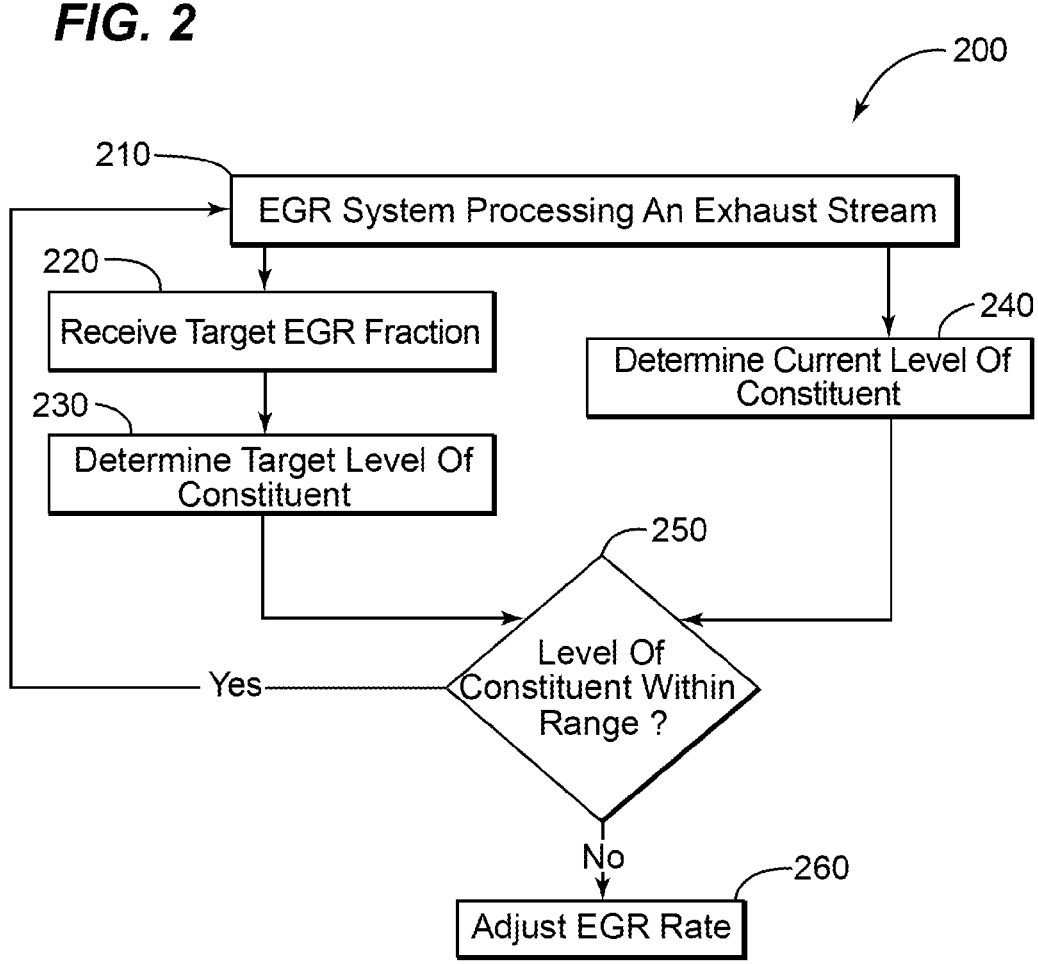
FIG. 2 is a flowchart illustrating an example of a method of controlling the composition of an inlet fluid in accordance with an embodiment of the present invention.

Referring now to FIG. 2, which is a flowchart illustrating an example of a method 200 of controlling the composition of an inlet fluid in accordance with an embodiment of the present invention. In an embodiment of the present invention the EGR system 107 may be integrated with a graphical user interface (GUI), or the like. The GUI may allow the operator to navigate through the method 200 described below. The GUI may also provide at least one notification of the status of the EGR system 107.

In step 210, of the method 200, the EGR system 107 may be processing an exhaust stream 170, as described. Depending on either the type and/or operation of the turbomachine 105, the generated exhaust may have a flowrate of about 10,000 Lb/hr to about 50,000,000 Lb/hr and a temperature of about 100 Degrees Fahrenheit to about 1,100 Degrees Fahrenheit.

In step 220, the method 200 may receive a target EGR fraction. The EGR fraction may be considered the amount, such as, but not limiting of, a percentage of the exhaust stream 170 within the inlet fluid. EGR fraction may be determined by dividing the mass flowrate of the exhaust stream 170 by the mass flowrate of the inlet air. In an embodiment of the present invention, the method 200 may automatically receive the EGR fraction from the control system operating the EGR system 107. In an alternate of the present invention, a user may enter the EGR fraction.

In step 230, the method 200 may determine the target level of at least one constituent. The method 200 may utilize a species conservation engine, or the like, to determine the target level. The species conservation engine may incorporate a plurality of turbomachine operating data along with the target EGR fraction to calculate the target level. The plurality of turbomachine operating data may include: at least one fuel composition; the compressor airflow of the turbomachine 105; and the fuel flow of the turbomachine 105. The at least one fuel composition may include, but are not limited to: the composition of the fuel entering a combustion system of the turbomachine 105; and the composition of the fuel used in an auxiliary firing system integrated with the turbomachine 105, wherein the auxiliary firing system may include an auxiliary boiler, or combinations thereof.

The species conservation engine may incorporate a physical equation, or the like, to calculate the target level of at least one constituent. As discussed, the at least one constituent includes at least one of: SOx, NOx, $CO_2$, water, chloride ions, acids, aldehydes, hydrocarbons, or combinations thereof.

The species conservation engine may incorporate a physical equation, or the like, to calculate the target level of at least one constituent. For example, but not limiting of, the species conservation engine may calculate a target exhaust $CO_2$ mole fraction as a function of: a target EGR mass fraction, fuel flow, fuel composition, and turbomachine 105 inlet flow. The target exhaust $CO_2$ mole fraction value may be compared to a $CO_2$ mole fraction measured by the constituent feedback device 175. The comparison process may yield an error signal, which the method 200 may use for feedback control of the EGR flow rate.

Additionally, the combustion reaction for the turbomachine 105 that burns a hydrocarbon fuel in standard air may be described by Equation 1, using molar coefficients, as illustrated below:

$$C_\alpha H_\gamma + (a+e)(O2 + 3.76 N2) => bCO2 + cH2o + eO2 + (a+e)(3.76)N2 \qquad \text{[Equation 1]}$$

Here, "fuel composition" is defined by the carbon and hydrogen subscripts, $\alpha$ and $\gamma$. The excess oxygen molar coefficient, e, may be calculated as a function of EGR mass fraction ($X_{EGR}$), compressor inlet mass flow ($W_C$) and fuel mass flow ($W_F$) as illustrated by Equation 2.

$$e = \frac{1}{4.76} \frac{W_C(1 - X_{EGR})}{W_F} \frac{MW_{fuel}}{MW_{air}} - (\alpha + \gamma/4) \qquad \text{Equation 2}$$

The target exhaust $CO_2$ mole fraction (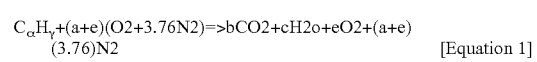), on a dry basis, may be calculated from the reaction in Equation 1 according to Equation 3.

$$y_{CO2\_target} = \frac{\alpha}{\alpha + e + (\alpha + \gamma/4 + e)(3.76)} \qquad \text{Equation 3}$$

Equations 1 through 3 may be adapted to perform similar species conservation calculations for constituents other than $CO_2$ or for a turbomachine 105 operating with different working fluids or fuel types. As discussed, the constituent includes at least one of: SOx, NOx, $CO_2$, water, chloride ions, acids, aldehydes, hydrocarbons, or combinations thereof.

In step 240, the method 200 may determine the current level of at least one constituent. As discussed, the EGR system 107 may include constituent feedback devices 175,177. The constituent feedback devices 175,177 may include sensors, transmitters, and similar devices that may provide data on the current level of the at least one constituent. The positions of the constituent feedback devices 175,177 may provide feedback on the composition of the inlet fluid. The constituent feedback devices 175,177 are generally located upstream and downstream of the combustion system of the turbomachine 105, increasing the accuracy of the feedback. The constituent feedback devices 175,177 may be integrated with the control system used to operate the method 200. The data provided by the constituent feedback devices 175,177 may be used to directly or indirectly determine the current level of at least one constituent.

In step 250, the method 200 may determine whether the current level of the at least one constituent is within a constituent range. Here, the method 200 compares the target level determined in step 230, and the current level determined in step 240, of the at least one constituent. In an embodiment of the present invention an operator may determine the range. In an alternate embodiment of the present invention the range may be automatically determined. For example, but not limiting of, if the target level is 1 and the current level is from about 0.95 to about 1.05, then the method 200 may determine that the current level of the at least one constituent is within range.

Additionally, for example, but not limiting of, the turbomachine 105 may be operated with a target EGR mass fraction of 30%, a fuel/compressor inlet flow ratio near 0.019 and a fuel composition of 97% methane ($CH_4$), 2% ethane (C2H6) and 1% propane (C3H8) which yields a target exhaust $CO_2$ mole fraction (dry) of 0.051. The method 200 may adjust the EGR flow rate to maintain the measured exhaust $CO_2$ mole fraction (dry) within +/−0.001 of the target, over a range of measured $CO_2$ mole fractions from 0.005 to 0.25.

If the level of at least one constituent is outside of the range then the method 200 may proceed to step 260; otherwise the method 200 may revert to step 210 where the steps 210-250 may repeat until the at least one constituent is outside of the range.

In step 260, the method 200 may adjust an EGR rate. As discussed, the EGR rate may be considered the rate and quantity of exhaust stream 170 entering the mixing station 115 where the inlet fluid is created.

An embodiment of the present invention may utilize the components of the EGR system 107 to adjust the EGR rate. For example, but not limiting of, the method 200 may incorporate at least one of the following functions: adjusting a speed of an EGR flow conditioning device 135, such as but not limiting of a source of air; wherein the source of air comprises a fan, a blower, or combinations thereof; adjusting a pitch of at least one EGR fan blade; modulating at least one flow control device. The flow control device may include at least one of: an inlet damper, a bypass damper, an exhaust damper, or combinations thereof.

In an embodiment of the present invention, the GUI may provide a notification to the user if the EGR rate should be adjusted.

Figure 3:
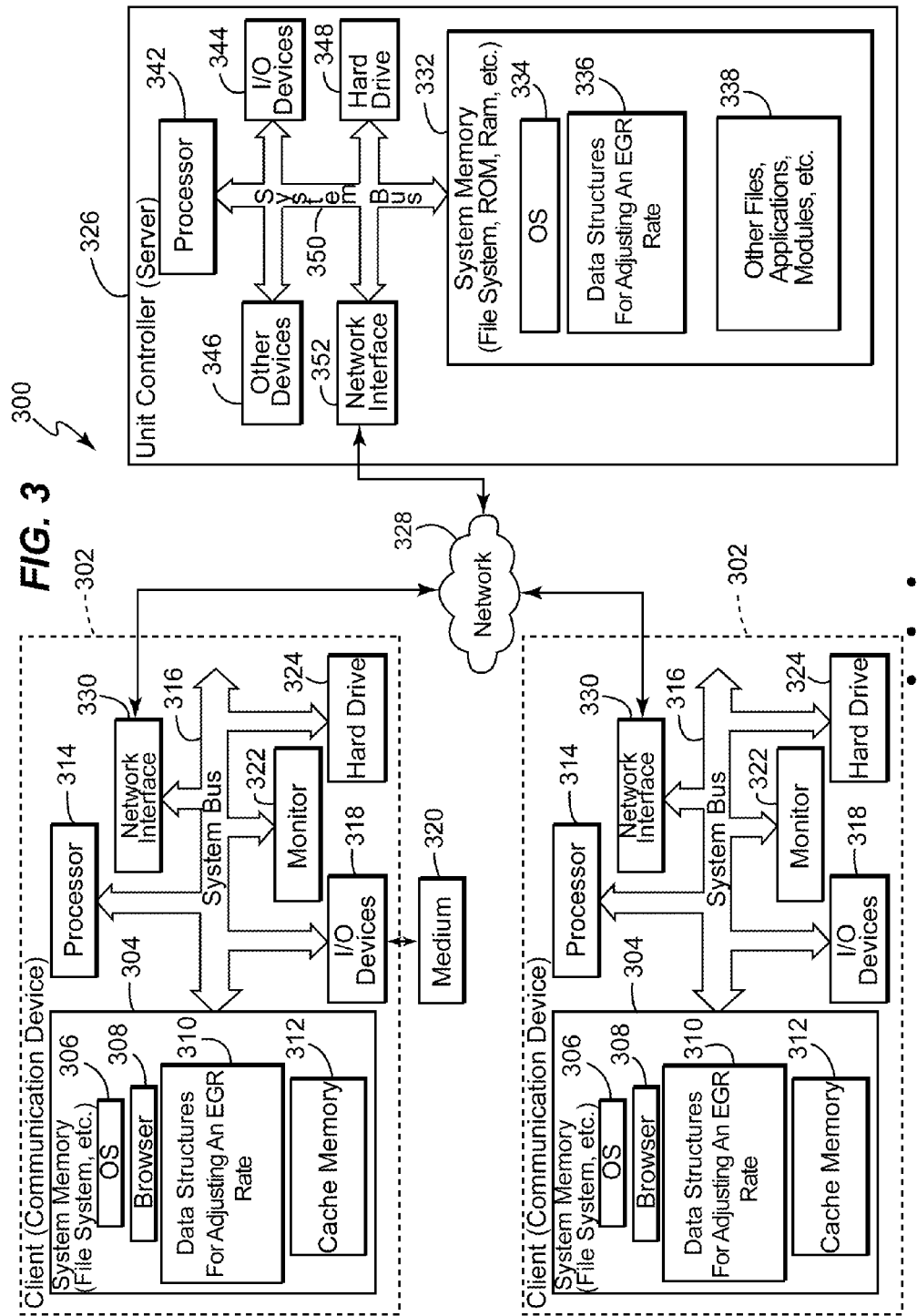
FIG. 3 is a block diagram of an exemplary system for adjusting an EGR rate in accordance with an embodiment of the present invention.

FIG. 3 is a block diagram of an exemplary system 300 for adjusting an EGR rate in accordance with an embodiment of the present invention. The elements of the method 200 may be embodied in and performed by the system 300. The system 300 may include one or more user or client communication devices 302 or similar systems or devices (two are illustrated in FIG. 3). Each communication device 302 may be for example, but not limited to, a computer system, a personal digital assistant, a cellular phone, or similar device capable of sending and receiving an electronic message.

The communication device 302 may include a system memory 304 or local file system. The system memory 304 may include for example, but is not limited to, a read only memory (ROM) and a random access memory (RAM). The ROM may include a basic input/output system (BIOS). The BIOS may contain basic routines that help to transfer information between elements or components of the communication device 302. The system memory 304 may contain an operating system 306 to control overall operation of the communication device 302. The system memory 304 may also include a browser 308 or web browser. The system memory 304 may also include data structures 310 or computer-executable code for adjusting an EGR rate that may be similar or include elements of the method 200 in FIG. 2.

The system memory 304 may further include a template cache memory 312, which may be used in conjunction with the method 200 in FIG. 2 for adjusting an EGR rate.

The communication device 302 may also include a processor or processing unit 314 to control operations of the other components of the communication device 302. The operating system 306, browser 308, and data structures 310 may be operable on the processing unit 314. The processing unit 314 may be coupled to the memory system 304 and other components of the communication device 302 by a system bus 316.

The communication device 302 may also include multiple input devices (I/O), output devices or combination input/output devices 318. Each input/output device 318 may be coupled to the system bus 316 by an input/output interface (not shown in FIG. 3). The input and output devices or combination I/O devices 318 permit a user to operate and interface with the communication device 302 and to control operation of the browser 308 and data structures 310 to access, operate and control the software to adjust an EGR rate. The I/O devices 318 may include a keyboard and computer pointing device or the like to perform the operations discussed herein.

The I/O devices 318 may also include for example, but are not limited to, disk drives, optical, mechanical, magnetic, or infrared input/output devices, modems or the like. The I/O devices 318 may be used to access a storage medium 320. The medium 320 may contain, store, communicate, or transport computer-readable or computer-executable instructions or other information for use by or in connection with a system, such as the communication devices 302.

The communication device 302 may also include or be connected to other devices, such as a display or monitor 322. The monitor 322 may permit the user to interface with the communication device 302.

The communication device 302 may also include a hard drive 324. The hard drive 324 may be coupled to the system bus 316 by a hard drive interface (not shown in FIG. 3). The hard drive 324 may also form part of the local file system or system memory 304. Programs, software, and data may be transferred and exchanged between the system memory 304 and the hard drive 324 for operation of the communication device 302.

The communication device 302 may communicate with a at least one unit controller 326 and may access other servers or other communication devices similar to communication device 302 via a network 328. The system bus 316 may be coupled to the network 328 by a network interface 330. The network interface 330 may be a modem, Ethernet card, router, gateway, or the like for coupling to the network 328. The coupling may be a wired or wireless connection. The network 328 may be the Internet, private network, an intranet, or the like.

The at least one unit controller 326 may also include a system memory 332 that may include a file system, ROM, RAM, and the like. The system memory 332 may include an operating system 334 similar to operating system 306 in communication devices 302. The system memory 332 may also include data structures 336 for adjusting an EGR rate. The data structures 336 may include operations similar to those described with respect to the method 200 for adjusting an EGR rate. The server system memory 332 may also include other files 338, applications, modules, and the like.

The at least one unit controller 326 may also include a processor 342 or a processing unit to control operation of other devices in the at least one unit controller 326. The at least one unit controller 326 may also include I/O device 344. The I/O devices 344 may be similar to I/O devices 318 of communication devices 302. The at least one unit controller 326 may further include other devices 346, such as a monitor or the like to provide an interface along with the I/O devices 344 to the at least one unit controller 326. The at least one unit controller 326 may also include a hard disk drive 348. A system bus 350 may connect the different components of the at least one unit controller 326. A network interface 352 may couple the at least one unit controller 326 to the network 328 via the system bus 350.

The flowcharts and step diagrams in the figures illustrate the architecture, functionality, and operation of possible implementations of systems, methods, and computer program products according to various embodiments of the present invention. In this regard, each step in the flowchart or step diagrams may represent a module, segment, or portion of code, which comprises one or more executable instructions for implementing the specified logical functions. It should also be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved. It will also be noted that each step of the step diagrams and/or flowchart illustration, and combinations of steps in the step diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of controlling an exhaust stream, wherein the exhaust stream is generated by a turbomachine; the method comprising:
    providing at least one exhaust gas recirculation (EGR) system comprising: at least one EGR flow conditioning device, a constituent reduction system, at least one flow control device;
        wherein the at least one EGR flow conditioning device increases the flowrate of the exhaust stream and comprises a source of air; wherein the source of air comprises a fan;
        wherein the EGR system reduces constituents within the exhaust stream from a first concentration to a second concentration and recirculates the exhaust stream to an inlet section of the turbomachine;
    receiving a target EGR fraction comprising the portion of the exhaust stream within an inlet fluid, wherein the inlet fluid enters the inlet section of the turbomachine;
    determining a target level of at least one constituent from the target EGR fraction;
    determining a current level of the at least one constituent;
    determining whether the current level of the at least one constituent is within a constituent range; and
    adjusting an EGR rate of the exhaust stream if the at least one constituent is outside of the constituent range.

2. The method of claim 1, wherein the at least one constituent comprises at least one of: SOx, NOx, $CO_2$, water, chloride ions, acids, aldehydes, hydrocarbons, or combinations thereof.

3. The method of claim 1, wherein the step of adjusting the EGR rate of the exhaust stream comprises at least one of: adjusting a speed of the EGR flow conditioning device; adjusting a pitch of at least one EGR fan blade; modulating at least one flow control device; wherein the at least one flow control device comprises at least one of: an inlet damper, a bypass damper, an exhaust damper, or combinations thereof.

4. The method of claim 1, wherein the step of adjusting the EGR rate of the exhaust stream further comprises providing at least one notification when the EGR rate of the exhaust stream requires adjustment.

5. The method of claim 1, wherein the constituent reduction system reduces up to about 99 percent of SOx constituents within the exhaust stream.

6. The method of claim 1, wherein the step of determining the current level of the at least one constituent comprises receiving data on the at least one constituent from at least one constituent feedback device; and wherein the data is used to adjust the EGR rate.

7. The method of claim 6, wherein the at least one constituent feedback device is located adjacent the inlet section.

8. The method of claim 6, wherein the at least one constituent feedback device is located adjacent an exhaust section of the turbomachine.

9. The method of claim 6, wherein the at least one constituent feedback device is located adjacent an extraction port of the turbomachine.

10. The method of claim 1, wherein the step of determining the target level of the at least one constituent comprises:
    receiving at least one fuel composition;
    receiving data on a compressor airflow of the turbomachine;
    receiving data on a fuel flow of the turbomachine; and
    determining the target level of the at least one constituent.

11. A method of controlling an exhaust stream, wherein the exhaust stream is generated by a turbomachine; the method comprising:

providing at least one exhaust gas recirculation (EGR) system comprising: at least one EGR flow conditioning device, a constituent reduction system, at least one flow control device;

wherein the at least one EGR flow conditioning device comprises a fan;

wherein the EGR system reduces constituents within the exhaust stream from a first concentration to a second concentration and recirculates the exhaust stream to an inlet section of the turbomachine;

wherein the constituent reduction system removes up to about 99 percent of SOx constituents within the exhaust stream;

receiving a target EGR fraction comprising the portion of the exhaust stream within an inlet fluid, wherein the inlet fluid enters the inlet section of the turbomachine;

determining a target level of at least one constituent from the target EGR fraction and integrating data received on the at least one constituent from at least one constituent feedback device;

determining a current level of the at least one constituent;

determining whether the current level of the at least one constituent is within a constituent range; and adjusting an EGR rate of the exhaust stream if the at least one constituent is outside of the constituent range; wherein the step of adjusting the EGR rate comprises providing at least one notification when the EGR rate of the exhaust stream requires adjustment;

wherein the at least one constituent comprises at least one of: SOx, NOx, $CO_2$, water, chloride ions, acids, aldehydes, hydrocarbons, or combinations thereof.

12. The method of claim 11, wherein the step of determining the target level of the at least one constituent comprises:

receiving at least one fuel composition;

receiving data on a compressor airflow of the turbomachine;

receiving data on a fuel flow of the turbomachine; and determining the target level of the at least one constituent.

13. The method of claim 11, wherein the at least one constituent feedback device is located adjacent the inlet section.

14. The method of claim 11, wherein the at least one constituent feedback device is located adjacent an exhaust section of the turbomachine.

15. The method of claim 11, wherein the at least one constituent feedback device is located adjacent an extraction port of the turbomachine.

16. The method of claim 11, wherein the step of adjusting the EGR rate of the exhaust stream comprises at least one of: adjusting a speed of the at least one EGR flow conditioning device; adjusting a pitch of at least one EGR fan blade; modulating at least one flow control device; wherein the at least one flow control device comprises at least one of: an inlet damper, a bypass damper, an exhaust damper, or combinations thereof.

17. A system for controlling an exhaust stream, wherein the exhaust stream is generated by a turbomachine; the system comprising:

at least one exhaust gas recirculation (EGR) system comprising: at least one EGR flow conditioning device, a constituent reduction system, at least one flow control device;

wherein the EGR system reduces constituents within the exhaust stream from a first concentration to a second concentration and recirculates the exhaust stream to an inlet section of the turbomachine;

means for receiving a target EGR fraction;

means for determining a target level of at least one constituent from the target EGR fraction;

means for determining a current level of the at least one constituent;

means for determining whether the current level of the at least one constituent is within a constituent range;

means for adjusting an EGR rate of the exhaust stream if the at least one constituent is outside of the constituent range; and means for providing at least one notification when the EGR rate of the exhaust stream requires adjustment.

18. The system of claim 17, further comprising a control system integrated with the at least one EGR system, wherein the control system comprises at least one processor, wherein the at least one processor:

receives at least one fuel composition data;

receives compressor airflow data;

receives fuel flow data; and determines a constituent target level.

19. The system of claim 17, wherein the at least one constituent feedback device is located adjacent the inlet section.

20. The system of claim 17, wherein the at least one constituent feedback device is located adjacent an exhaust section of the turbomachine.

* * * * *